United States Patent [19]

Champlin

[11] 4,086,071

[45] Apr. 25, 1978

[54] AIR FILTER ASSEMBLY

[75] Inventor: Charles L. Champlin, Rittman, Ohio

[73] Assignee: Packaging Corporation of America, Evanston, Ill.

[21] Appl. No.: 712,588

[22] Filed: Aug. 9, 1976

[51] Int. Cl.² ............................................. B01D 46/10
[52] U.S. Cl. ........................................ 55/501; 55/511;
   55/529; 55/DIG. 31; 229/34 R; 229/41 B
[58] Field of Search ................. 55/501, 511, 512, 518,
   55/DIG. 31, 529, 494, 495; 229/34 R, 41 B

[56] References Cited

U.S. PATENT DOCUMENTS

| | | | |
|---|---|---|---|
| 2,519,831 | 8/1950 | Frankenstein | 229/41 B X |
| 2,646,915 | 7/1953 | Bockmann | 229/34 R |
| 2,686,001 | 8/1954 | Arneson | 229/34 R |
| 3,154,393 | 10/1964 | Klein et al. | 55/DIG. 31 X |
| 3,830,045 | 8/1974 | Copenhefer | 55/501 |
| 3,938,973 | 2/1976 | Kershaw | 55/511 X |
| 3,970,440 | 7/1976 | Copenhefer et al. | 55/501 |

*Primary Examiner*—Frank W. Lutter
*Assistant Examiner*—Kathleen J. Prunner
*Attorney, Agent, or Firm*—Neuman, Williams, Anderson & Olson

[57] ABSTRACT

An air filter assembly is provided which comprises a multisided air filter panel and a multisided supporting frame therefor. The frame is of unitary construction and includes a foraminous center section, and a marginal section delimiting the center section. The center and marginal sections are in supporting engagement with one surface of the filter panel. The frame is provided with a plurality of peripheral sections which are foldably connected to the marginal section and cooperate with one another to delimit the center and marginal sections. Each peripheral section includes foldably connected first and second flange segments which are disposed in substantially face-to-face fold back relation. The first flange segment is foldably connected to a portion of the marginal section and extends angularly inwardly therefrom and forms an acute angle with the portion of the marginal section to which it is attached. A third segment is foldably connected to the second flange segment and extends angularly therefrom. Tabs are foldably connected to the ends of the second flange segments of alternate peripheral sections and when the frame is set up in assembled relation the tabs become automatically aligned with and inserted into adjacent pockets formed by the adjacent first and second flange segments of the adjacent peripheral section. A peripheral portion of the filter panel is secured in sandwiched relation between the marginal section and the third segment of each peripheral section. The construction of the frame enables the filter assembly to assume a collapsed state so that a plurality of such assemblies can form a compact bundle for shipping and/or storage.

5 Claims, 8 Drawing Figures

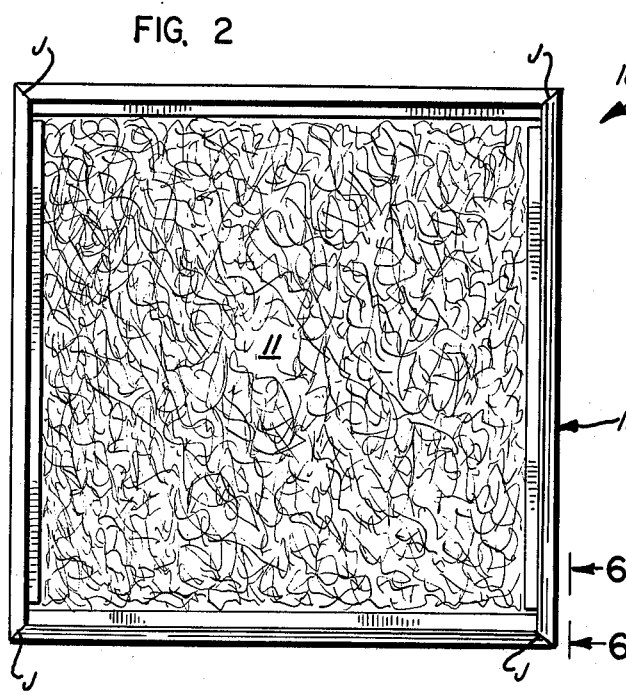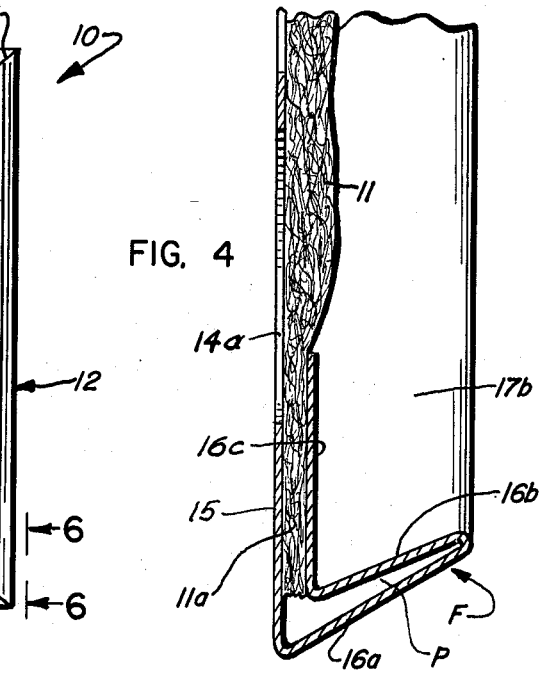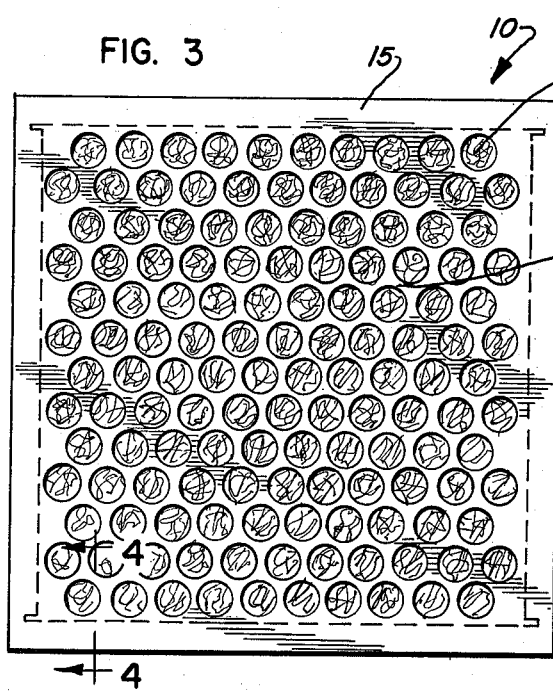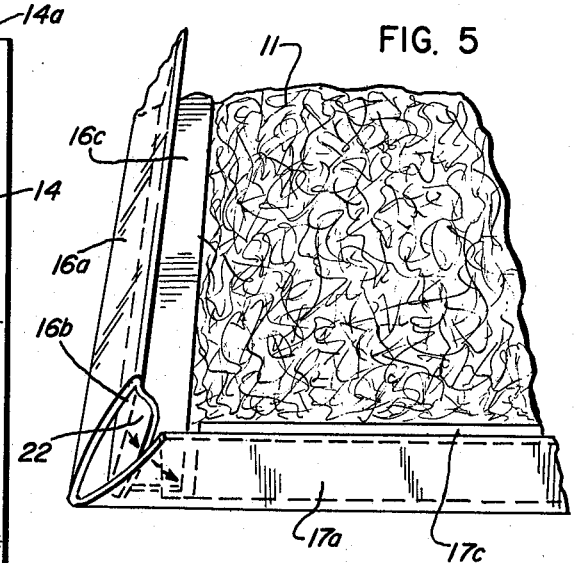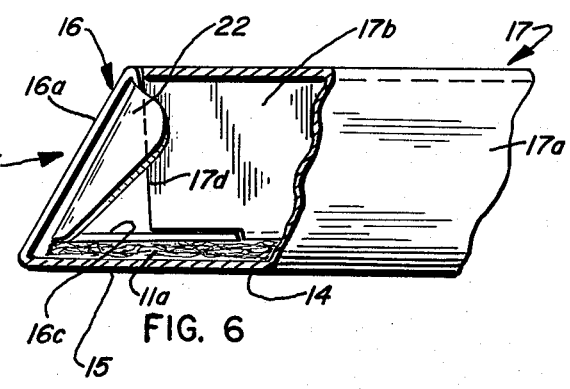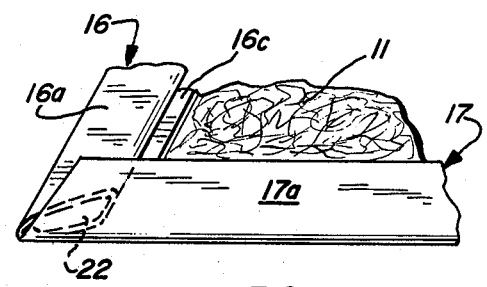

AIR FILTER ASSEMBLY

BACKGROUND OF THE INVENTION

With the advent of forced air heating and cooling in homes, commmercial buildings, manufacturing plants and the like, the use of air filters has become widespread. Initially the air filter assemblies were difficult and costly to manufacture and frequently were awkward to handle. The frames utilized to accommodate the filter panels or pads were of costly construction because of the need for numerous components requiring an inordinate amount of manual labor to assemble. Frame constructions were subsequently improved by significantly reducing the number of components and the amount of manual labor required. Such improved frame constructions, however, were not without shortcomings, e.g., they did not provide adequate support for the pliable filter panel normally employed in such an assembly. Where inadequate support was provided for the filter panel, the latter became severely distorted when subjected to the flow of air therethrough whereby in certain instances peripheral portions of the filter panel became disengaged from the frame and thus, provided gaps through which the air could flow unfiltered.

In other instances, the prior frame constructions were susceptible to being torn or permanently deformed when the latter was subjected to normal handling during shipping, storage, or when being installed in a heating and/or air conditioning unit.

SUMMARY OF THE INVENTION

Thus, it is an object of the invention to provide an air filter assembly which is of simple, inexpensive, yet sturdy construction, and is highly efficient in operation.

It is a further object of the invention to provide an air filter assembly wherein the frame thereof is of unitary construction, is formed from a blank of inexpensive sheet material and the frame blank may be readily formed by conventional automatic high-speed cutting, slotting and scoring equipment.

It is a still further object of the invention to provide an air filter assembly wherein the filter panel and the unitary frame may be assembled by automatic or semiautomatic equipment.

It is a still further object of the invention to provide an air filter assembly wherein the periphery thereof is reinforced thereby facilitating handling of the assembly.

It is a still further object of the invention to provide an air filter assembly wherein a portion of the supporting frame thereof may be collapsed so as to facilitate packaging of the assembly with other like assemblies so as to occupy a minimal amount of space.

It is a still further object of the invention to provide an air filter assembly wherein the collapsed portions of the supporting frame may be readily manipulated so as to assume an operative position.

Further and additional objects will appear from the description, accompanying drawings, and appended claims.

In accordance with one embodiment of the invention, an improved air filter assembly is provided which utilizes a multisided filter panel and a unitary frame in supporting engagement therewith. The filter panel is of conventional construction and is preferably formed of glass fibers held in a very porous mass by a thermoset binder, e.g., phenol formaldehyde solution extended twenty percent with an emulsion of Vinsol, a rosin derivative. The filter panel is normally sprayed with a non-drying, non-volatile mineral oil. The dimensions of the filter panel are normally of standard sizes and will depend upon the size of the unit in which the assembly will be eventually installed. The frame for the filter panel is preferably formed from a blank of fiberboard material and includes a foraminous center section which is delimited by a marginal section. The center and marginal sections are disposed in coplanar relation and in supporting face-to-face engagement with one surface of the filter panel. The peripheral configurations of the filter panel and the marginal section are substantially the same. Foldably connected to peripheral portions of the marginal section are a plurality of peripheral sections which cooperate with one another to form a reinforcing flange which delimits the center and marginal sections. Each peripheral section includes foldably connected first and second flange segments which are disposed in substantially face-to-face fold back relation and extend angularly inwardly and form an acute angle with respect to the portion of the marginal section to which the peripheral section is connected. A third segment is foldably connected to the second flange segment and cooperates with the marginal section to fixedly secure a peripheral portion of the filter panel in sandwiched relation therebetween.

DESCRIPTION

For a more complete understanding of the invention reference should be made to the drawings wherein:

FIG. 2 is a plan view of the upstream side of one form of the improved air filter assembly.

FIG. 3 is a plan view of the downstream side of the filter assembly of FIG. 2.

FIG. 4 is an enlarged fragmentary sectional view taken along line 4—4 of FIG. 3.

FIG. 5 is an enlarged fragmentary perspective view of one corner of the assembly of FIG. 2 and showing the interconnecting tab of one peripheral section disengaged from the end limit of an adjacent peripheral section forming the corner in question.

FIG. 6 is an enlarged fragmentary side elevational view taken along line 6—6 of FIG. 2 and with a portion of the first flange segment removed so as to show the disposition of the interconnecting tab in operative position.

FIG. 7 is an enlarged fragmentary perspective view similar to FIG. 5 but showing portions of the peripheral sections in a collapsed condition.

Figure 1:
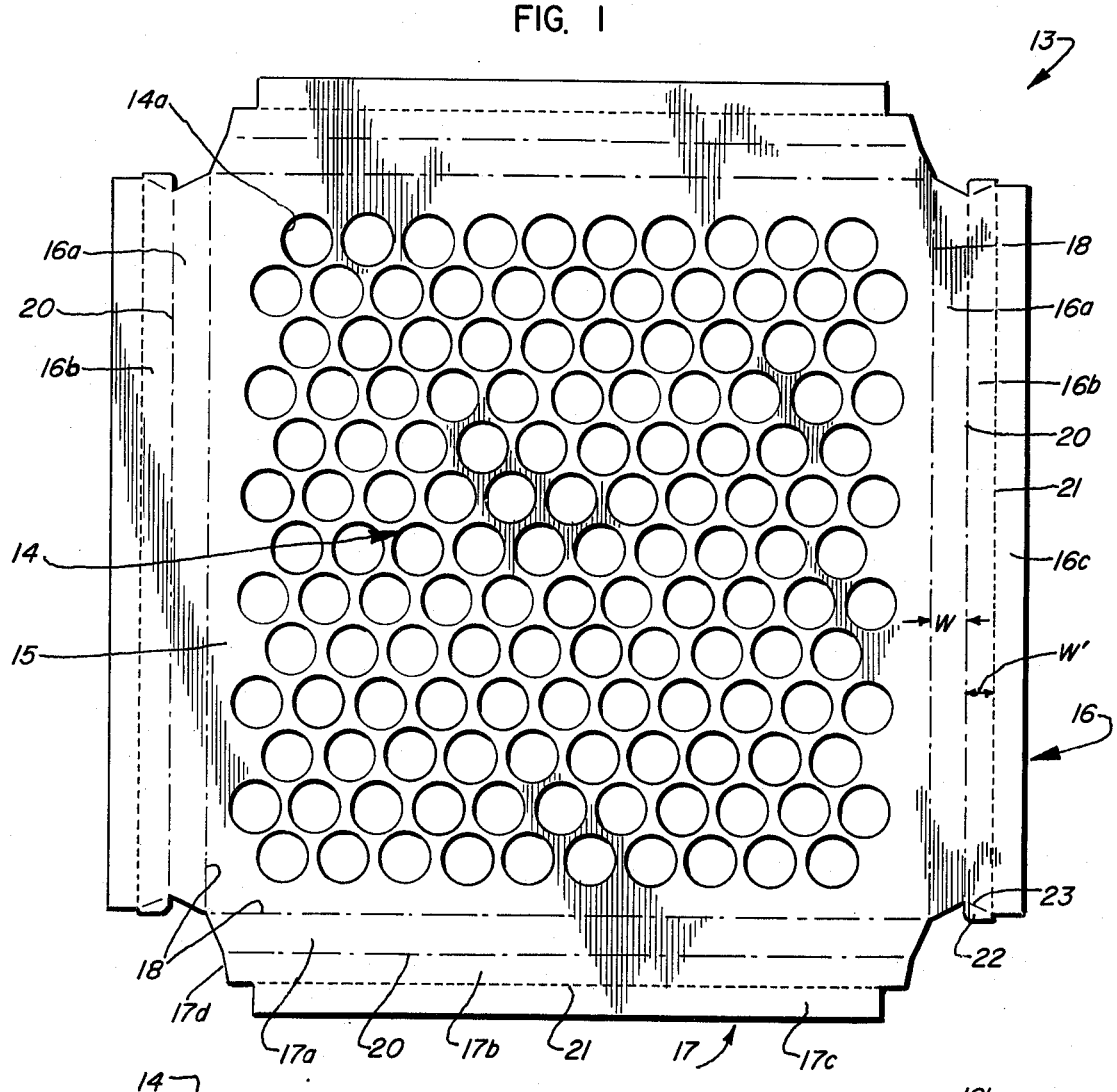
FIG. 1 is a plan view of one form of a frame blank used in the improved air filter assembly.

Referring now to the drawings and more particular to FIGS. 2 and 3, one form of the improved air filter assembly 10 is shown which is particularly suitable for use in a forced air heating and/or air conditioning unit, not shown. The size and shape of the assembly will depend upon the size and shape of the unit in which the assembly is to be placed when in use. Basically, the assembly 10 comprises a multisided filter panel or pad 11 and a supporting frame 12 associated therewith. The assembly 10 normally has a rectangular or square peripheral configuration. The filter panel 11 is preferably formed of glass fibers, as disclosed in detail in U.S. Pat. No. 3,023,839. The normal thickness of the panel 11 is approximately one inch, but may vary as desired. The panel is very porous and the fibers thereof are normally sprayed with non-drying, non-volatile mineral oil thereby causing dust, or other foreign particles, entrained in the flowing air to become deposited on the treated glass fibers in a manner well understood in the art. Because of the inherent flimsy, pliable character of the panel 11, it is necessary that it be supported by a frame 12.

The frame 12 is of unitary construction and is preferably formed from a blank 13 of fiberboard or like material. Such material is inexpensive, light weight and yet is possessed of inherent stiffness to provide the necessary support for the filter panel 11.

Figure 1A:
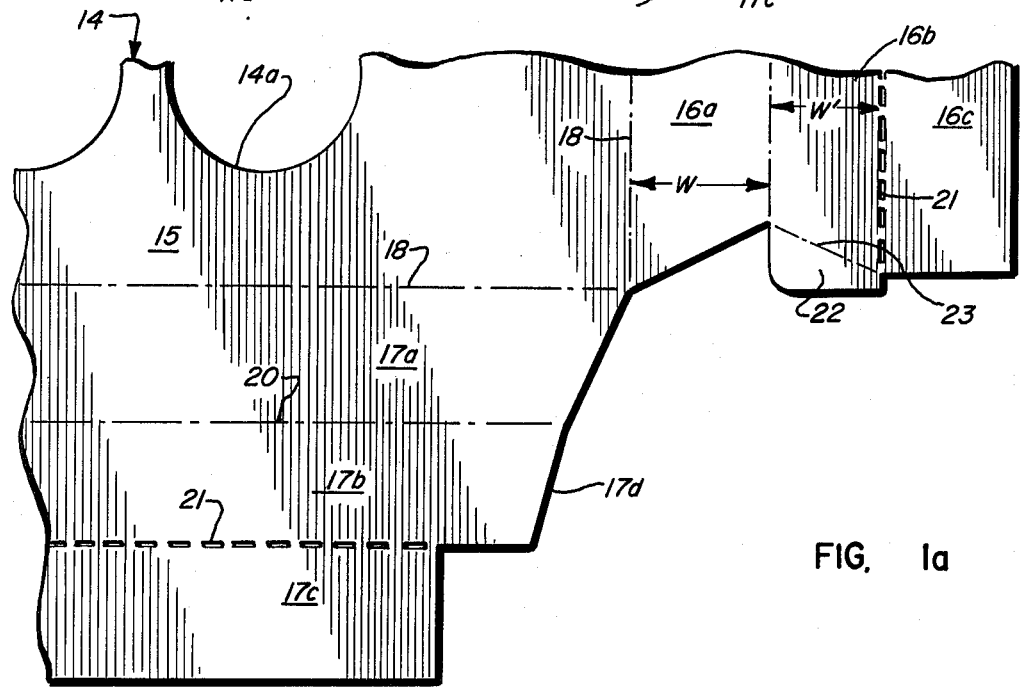
FIG. 1A is an enlarged fragmentary plan view of one corner of the blank shown in FIG. 1.

Blank 13, in one form, is shown in FIGS. 1 and 1A and includes a foraminous or perforated center section 14 which is delimited by a marginal section 15 which is preferably imperforate. The center and marginal sections 14 and 15 combine to have a shape corresponding substantially to the peripheral configuration of filter panel 11. The sections 14 and 15 are coplanar and engage in face-to-face relation the downstream surface of the panel 11. That is to say the surface from which the flowing air leaves the panel 11. Center section 14, as seen in FIG. 1, is provided with rows of apertures 14a arranged in staggered relation. Notwithstanding the large number of apertures 14a formed in section 14, the latter will substantially resist bowing or distortion of the panel surface due to the air flowing through the panel. Section 14 provides a minimal amount of resistance to the air flow. Marginal section 15, as aforementioned, is preferably imperforate so as to provide a more effective surface to which the peripheral, or edge, portion 11a of the panel 11 is attached in a manner to be described more fully hereinafter.

In addition to the center and marginal sections 14 and 15, the frame 12 includes a plurality of peripheral sections 16 and 17 which are foldably connected to the side edges of marginal section 15. Sections 16 and 17 are generally of the same configuration except as will hereinafter be discussed. Sections 16 are arranged in one alternate set with respect to sections 17 arranged in a second alternate set, as seen in FIG. 2.

Each section 16, 17, see FIG. 1, includes a first flange segment 16a, 17a which is connected by foldline 18 to the adjacent portion of the marginal section 15. Connected by foldline 20 to the opposite elongated distal edge of segment 16a, 17a is a second flange segment 16b, 17b. As seen in FIG. 4, the first and second flange segments 16a, 16b are disposed in substantially face-to-face fold back relation when the blank is set up to form frame 12. Connected by foldline 21 to the elongated edge of the second flange segment 16b, 17b is a third segment 16c, 17c. When the frame and filter panel are assembled together, the third segment 16c, 17c cooperates with the corresponding portion of marginal section 15 and compresses a peripheral portion 11a of the filter panel 11 therebetween. The thermoset binder of the panel coupled with a suitable adhesive applied to the adjacent surfaces of the third segment and corresponding portion of the marginal section 15 provide an effective bond between the frame and filter panel.

The width dimension W of the first flange segment 16a, 17a, which is measured between foldlines 18 and 20, is greater than the corresponding width dimension W' of the second flange segment 16b, 17b, and as a result thereof the flange segments, when folded relative to one another into an operative position, form an inwardly protruding flange F, see FIG. 4. Furthermore, it will be noted in FIG. 4 that fold back segments 16a, 16b are not in contact with one another, but instead are slightly spaced from one another so as to form an elongated narrow pocket P, the function of which will be discussed more fully hereinafter.

In the blank embodiment illustrated in FIG. 1, the second flange segment 16b of each peripheral section 16 has a longitudinally extending tab 22 connected by a foldline 23 to each end thereof. When the blank 13 is set up in assembled relation with the filter panel 11 and the peripheral sections 16, 17 are moved into an operative position, each tab 22 of peripheral section 16 is folded about foldline 23 and automatically aligns itself with and is inserted into a corresponding opening of pocket P formed by the first and second segments 17a, 17b of the adjacent peripheral section 17, see FIG. 6. Thus, the tabs 22 effect interconnection at the corners of the frame and span the corner joints J formed between the adjacent peripheral sections 16 and 17. To facilitate insertion of the tab into the end of pocket P, the narrow edge 17d is cut back as seen more clearly in FIG. 6. The tabs serve multi functions; for example, they reinforce the corners, retain the adjacent peripheral sections in proper angular alignment with respect to one another, and reduce substantially air flow leakage at the corners.

When the assembly 10 is to be shipped to the customer in bulk, that is to say with a plurality of like assemblies, and said assemblies are packaged or bundled together, the peripheral sections 16, 17 of each assembly assume an inoperative collapsed stage, as seen more clearly in FIG. 7, thereby reducing significantly the thickness of the assembly. Thus, the plurality of assemblies can be arranged in a stacked relation and then compressed so as to form a compact bundle or package, which is convenient for shipping and/or storage. When the assembly is removed from the bundle or package, the peripheral sections 16 and 17 are manually folded upwardly to an operative position causing each tab 22 to automatically align itself with the adjacent opening to the pocket of section 17, whereupon, as the sections 16, 17 are released, they will automatically assume their appropriate angular positions and the tabs will be inserted into the adjacent pockets.

It will be noted in FIG. 7 that when the peripheral segments 16, 17 are in a collapsed state, the tabs 22 and associated end of the peripheral section 16b to which it is attached are overlapped by the adjacent end of section 17.

Because of the double thickness of the frame flange F, the angular disposition of the flange sections 16, 17, and the interconnection between the sections 16, 17 caused by the tabs 22, the frame 12 is possessed of an inherent stiffness which greatly facilitates handling of the assembly when it is being positioned in place within a heating and/or air conditioning unit or being removed therefrom. Furthermore, the frame prevents undesirable distortion of bowing of the filter panel when it is subjected to normal air flow. The frame blank can be readily formed by conventional, automatic high speed equipment and assembled with the filter panel in an expeditious manner and with a minimal amount of manual labor.

I claim:

1. An air filter assembly comprising a compressible air previous multisided filter panel, and a frame in supporting engagement therewith; said frame being formed from a single blank of foldable sheet material and including a foraminous center section having one surface thereof in supporting face-to-face engagement with a surface of said filter panel, a marginal section delimiting said center section and having portions thereof corresponding to the multisides of said filter panel, and a plurality of elongated peripheral sections arranged in alternate sets and being foldably connected to the periphery of the marginal section, each peripheral section having a segment coacting with a portion of said marginal section to fixedly sandwich and compress therebetween and edge portion of said filter panel, said peripheral sections being foldably adjustable relative to one another from an inoperative position to an operative position, said peripheral sections, when in said inoperative position, having one alternate set of peripheral sections overlapping a second alternate set of peripheral sections and said sets assuming a collapsed substantially overlapping relation with respect to the filter panel compressed edge portions and, when said peripheral sections are adjusted to said operative position, said second alternate sets of peripheral sections having tab-like end portions automatically aligned with and inserted into adjacent openings formed in the ends of the adjacent said one alternate set of peripheral sections and effecting interlocking of said peripheral sections in corner-forming relation whereby a substantially continuous flange is formed projecting angularly away from a plane including said marginal section; the peripheral sections of each alternate set, when in operative position, projecting angularly from the marginal section towards said foraminous center section to form an acute included angle whereby an elongated edge of each peripheral section overlies in spaced relation an adjacent portion of the marginal section.

2. The air filter assembly of claim 1 wherein each peripheral section of the said one alternate set of peripheral sections includes foldably connected flange segments disposed in fold back substantially face-to-face relation and forming an elongated openended pocket therebetween, each flange segment coacting with an adjacent portion of the marginal section to form an acute included angle.

3. The air filter assembly of claim 2 wherein one of the foldably connected flange segments is disposed inwardly relative to a second flange segment in a direction towards the foraminous center section, the ends of said one flange segment adjacent the pocket openings being angularly cut back relative to the adjacent ends of said second flange segment whereby a substantially large opening is provided for accommodating a corresponding tab-like end portion of an adjacent peripheral section of the second alternate set of peripheral sections when the sets of peripheral sections are adjusted in an operative position.

4. A blank of foldable sheet material for use in an air filter assembly to form a supporting frame capable of being collapsed for a multisided filter panel, said blank comprising a multisided section having a foraminous central portion delimited by a marginal portion, said multisided section being adapted to supportingly engage one surface of the filter panel, the multisides of the filter panel corresponding substantially to the multisides of said section; and a plurality of elongated peripheral sections foldably connected to the multisides of said section, said peripheral sections being in adjoining relation and adapted to be folded relative to one another to form a substantially continuous flange projecting away from and delimiting the multisided section, the distal edge of the flange defining an area less than the area of said multisided section, each peripheral section including an elongated first flange segment connected by a first foldline to a corresponding edge of the marginal portion, an elongated second flange segment connected to said first flange segment by a second foldline, the latter being shorter in length than said first foldline, each first flange segment having end edges extending convergently from said first foldline to said second foldline, and an elongated third segment connected to said second flange segment by a third foldline, the distance between said first and second foldlines being greater than the distance between said second and third foldlines, said third segment being adapted to coact with said marginal portion to sandwich therebetween an edge portion of the filter panel, said first, second and third foldlines being in spaced substantially parallel relation; corresponding flange segments of predetermined peripheral sections having end tabs, each tab being foldable about a diagonally disposed fourth foldline and being adapted, when said blank is set up to form the frame, to lockingly engage flange segments of an adjoining peripheral section and form a corner of the substantially continuous flange.

5. The blank of claim 4 wherein each end tab is connected by the fourth foldline to a selected second flange segment, said fourth foldline coating with said third foldline to form an acute included angle.

* * * * *

UNITED STATES PATENT AND TRADEMARK OFFICE
CERTIFICATE OF CORRECTION

PATENT NO. : 4,086,071
DATED : April 25, 1978
INVENTOR(S) : CHARLES L. CHAMPLIN

It is certified that error appears in the above-identified patent and that said Letters Patent are hereby corrected as shown below:

Column 4, line 30 — "stage" should be --state--

Column 4, line 57 — "of" (1st occurrence) should be --or--

Claim 1, Column 4, line 65 — "previous" should be --pervious--

Claim 1, Column 5, line 10 — "and" should be --an--

Claim 5, Column 6, line 46 — "coating" should be --coacting--

Signed and Sealed this

Nineteenth Day of September 1978

[SEAL]

Attest:

RUTH C. MASON
Attesting Officer

DONALD W. BANNER
Commissioner of Patents and Trademarks